United States Patent [19]

Stuemky

[11] 4,027,502
[45] June 7, 1977

[54] CENTERING DEVICE FOR TUBULAR FLEXIBLE ELEMENT COUPLINGS

[75] Inventor: Robert E. Stuemky, Elizabeth, Colo.

[73] Assignee: The Gates Rubber Company, Denver, Colo.

[22] Filed: Feb. 17, 1976

[21] Appl. No.: 658,634

[52] U.S. Cl. .......................................... 64/8; 64/7; 64/11 B; 64/15 R; 403/21; 403/22
[51] Int. Cl.² ............................................ F16D 3/02
[58] Field of Search ............. 64/8, 7, 15 R, 15 C, 64/6, 11 B; 403/11, 21, 22

[56] References Cited
UNITED STATES PATENTS

| 1,910,880 | 5/1933 | Blake | 64/15 R |
| 2,245,764 | 6/1941 | Döme et al. | 64/15 C |
| 3,678,706 | 7/1972 | Shirley et al. | 64/7 |
| 3,779,038 | 12/1973 | Stuemky | 64/11 B |
| 3,858,412 | 1/1975 | Fisher et al. | 64/8 |

Primary Examiner—Samuel Scott
Assistant Examiner—Randall Heald
Attorney, Agent, or Firm—H. W. Oberg, Jr.; Raymond Fink; Curtis H. Castleman

[57] ABSTRACT

A centering device for tubularly shaped flexible element couplings that includes a ball retained in a socket and a pin extending through an aperture of the ball, the pin having stop means which allows axial pin movement but prevents the pin from extracting from the ball aperture.

5 Claims, 3 Drawing Figures

CENTERING DEVICE FOR TUBULAR FLEXIBLE ELEMENT COUPLINGS

BACKGROUND OF THE INVENTION

The invention relates to flexible shaft couplings, but more particularly, the invention relates to centering devices which define a positive center of rotation for angular misalignment between two shafts interconnected with a flexible coupling.

Centering devices are used in flexible couplings to define a positive center of rotation for two angularly misaligned shafts or rotating components, and to minimize run-out and balance problems. A centering device is usually required where flexing elements of a coupling do not per se define a kinematic center as for example, in a spring-type or double cardan coupling. A typical centering device includes a ball retained in a socket which permits unrestrained angular movements within the limits defined by a cone. Another type of centering device includes a ball retained in a socket with a pin extending axially through an aperture in the ball. Ball, socket, or pin combinations are generally used for mechanical element couplings such as the double cardan type, but they also may be used with flexible element couplings that are tubularly shaped. Examples of tubularly shaped flexible element couplings appear in U.S. Pat. Nos. 3,347,061; 3,621,674; 3,628,352; and 3,855,817.

The tubularly shaped flexible elements present a problem not found with mechanical type couplings. In mechanical type couplings, the balls, socket, or pin do not have to be physically retained together if failure occurs. Should the coupling fail, shafts coupled therewith are mechanically retained to each other by other metal components of the flexible coupling such as by a "yoke" and "cross."

Tubularly shaped elements present another problem, especially where spring type members are used. The failure of the tubularly shaped element results in a mechanical disengagement of two shafts because there is nothing to hold the shafts together after the tubularly shaped element fails. Another problem associated with centering devices for tubularly shaped elements is that they do not facilitate easy assembly or adjustment means that accommodate assembly tolerances. Assembly to a controlled tolerance is particularly difficult with tubular couplings as disclosed in the U.S. Pat. No. 3,855,817. This invention is primarily directed to centering devices for use with tubularly shaped flexible couplings.

SUMMARY OF THE INVENTION

The centering device of the invention includes a ball retained within a socket and a pin axially extending through an aperture of the ball. The socket is rigidly retained to one end of a tubularly shaped flexible element while the pin is rigidly retained to a second end of the tubularly shaped flexible element. A stop means is provided along the pin to preclude its disengagement from the ball. Preferably, the stop means are axially adjustable along the pin which yields an unexpected advantage of controlling increased buckling strength for tubularly shaped flexible elements comprised of oppositely wound spring elements.

Accordingly, an object of the invention is to provide a "fail safe" centering device for tubularly shaped flexible elements that is easy to assemble, capable of adjustment to accommodate manufacturing tolerances and which prevents physical separation between two end points of a tubularly shaped flexible element should the flexible element become disjoined.

A salient advantage of the invention is that the torque carrying capacity is enhanced and may be controlled for an oppositely wound spring element coupling such as the type disclosed in U.S. Pat. No. 3,628,352.

Another advantage of the invention is that the axial growth of a tubularly shaped flexible element can be controlled in a manner such that end loadings imparted by the flexible element to coupled shafts are minimized or limited.

These and other objects or advantages of the invention will be apparent after reviewing the drawings and description thereof wherein.

TECHNICAL DISCLOSURE

Figure 2:
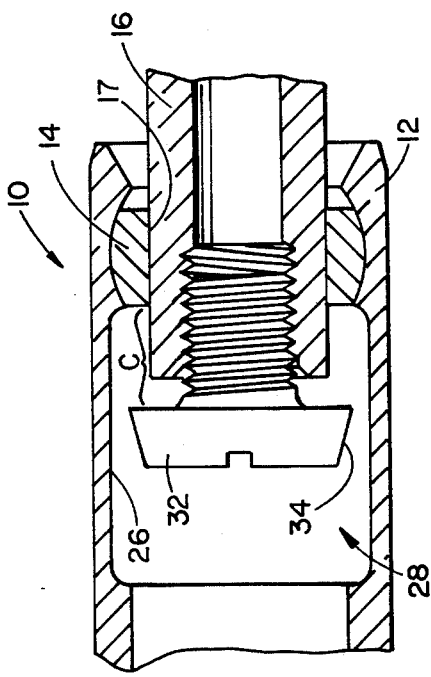
FIG. 2 is an enlarged partial view of FIG. 1 showing the centering device of the invention.

Referring to the figures, a centering device 10 for tubularly shaped flexible element couplings is provided which includes a socket member 12, a spherical ball 14 retained in the socket member and a pin 16 axially extending and retained through an aperture 17 of the ball. The ball is positioned in the socket by known means such as a longitudinal slot in the socket as used in pillow block bearings. The centering device is particularly suitable for use with flexible elements of the type disclosed in U.S. Pat. Nos. 3,628,352 and 3,855,817. The details of such tubularly shaped flexible elements are herein incorporated by reference.

The socket member 12 is rigidly retained to one end of a flexible element 18 by means of a coupling member 20. An example of a suitable coupling member is disclosed in U.S. Pat. No. 3,788,098. Similarly, the pin is rigidly retained, such as by serrations and a press fit, or cast-in place to a second end of the flexible element by means of a second coupling member 22. The coupling members are adaptable for attachment to shaft members such as with an internal spline serrations and press fit 23 or bolt circle 24.

An extension of the socket member is radially relieved 26 to accommodate a conical path traced by the pin when the centering device is operating.

A stop means 28 with a radial extension or collar 30 that is greater than the internal diameter of the spherical ball aperture 17 is secured to the free end of the pin with fasteners such as a threaded bolt 32, or a threaded nut 33. It is preferred that the stop means be separately attached so that the centering device may be easily assembled. Also, it is preferred that the shoulder 30 of the stop means be axially adjusted along the pin to a desired clearance C because some tubularly shaped flexible elements undergo a length change during operation. Such adjustment permits compensating for manufacturing tolerances of the flexible element 18 and coupling members 20, 22. The axial clearance C also affects the torque carrying capacity of certain types of flexible elements and it also controls the magnitude of end thrust which may be developed in a flexible coupling during operation. One end of the stop means may be chamfered 34 so that when the element is flexed, there is a positive clearance between the stop means and the radial relief of the socket.

Oppositely wound spring type tubularly shaped flexible elements characteristically increase in length under torque loads. The oppositely spiralled spring elements "pair" with each other to form a column while the element is operating in forward and reverse manner. Consequently, there is a positive increase of length in this type of flexible element during forward or reverse operation. The stop means 28 prevents the element from growing in length once the shoulder of the stop means is in contact with the side of the ball. By adjusting the clearance C, the amount of thrust load generated by the flexible element under torque conditions may be controlled.

Figure 1:
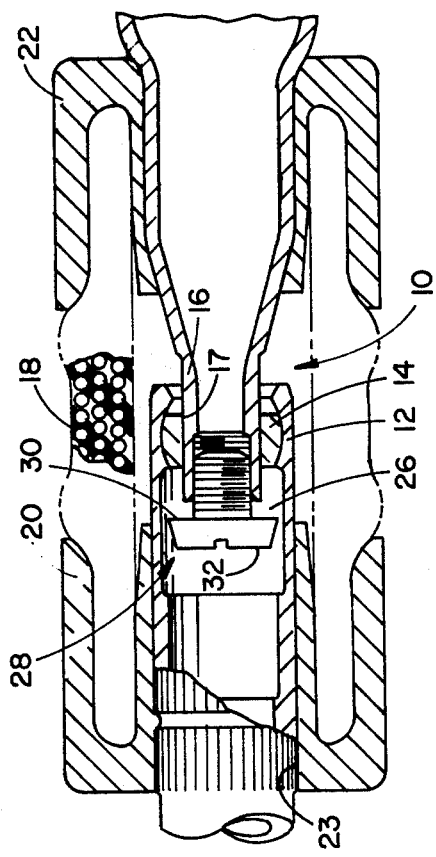
FIG. 1 is an axial view showing the centering device of the invention integral with a flexible coupling.

A salient advantage of such a stop means is that the torque carrying capacity of a spiralled spring type element is significantly increased once the stop means is against the spherical ball. The occurrence of increased torque capacity is controlled by adjusting the clearance C. For example, a 3½ inch mean diameter flexible element of the type disclosed in the U.S. Pat. No. 3,628,352 was constructed and coupling members were attached to the ends thereof. The flexible coupling was of the type disclosed in FIG. 1. The torque carrying capacity at buckling was measured both with and without the stop means. The flexible coupling without the stop means had a buckling strength of 1600 foot pounds whereas the flexible coupling with the positive stop means and no clearance had a buckling strength of 2200 foot pounds.

In use, a centering device 10 is assembled with a tubularly shaped flexible element 18 to a clearance C. there is an unseparable mechanical hook-up between the first and second coupling members. Mechanical hook-up is through the rigidly mounted socket member 12, the spherical ball 14 retained in the socket member 12, the pin 16, stop means 24, and the second coupling member 22. Should the tubularly shaped flexible element fail or break, mechanical integrity between connected shafts is maintained. If for example, the coupling member were used in the drive shaft of an automobile, failure of the flexible element would not result in uncontrolled dropping of a coupled propeller shaft. The centering device would maintain mechanical integrity and prevent such an occurrence even though the torque transmitting capabilities of the flexible element were terminated.

ADDITIONAL SPECIES

Figure 3:
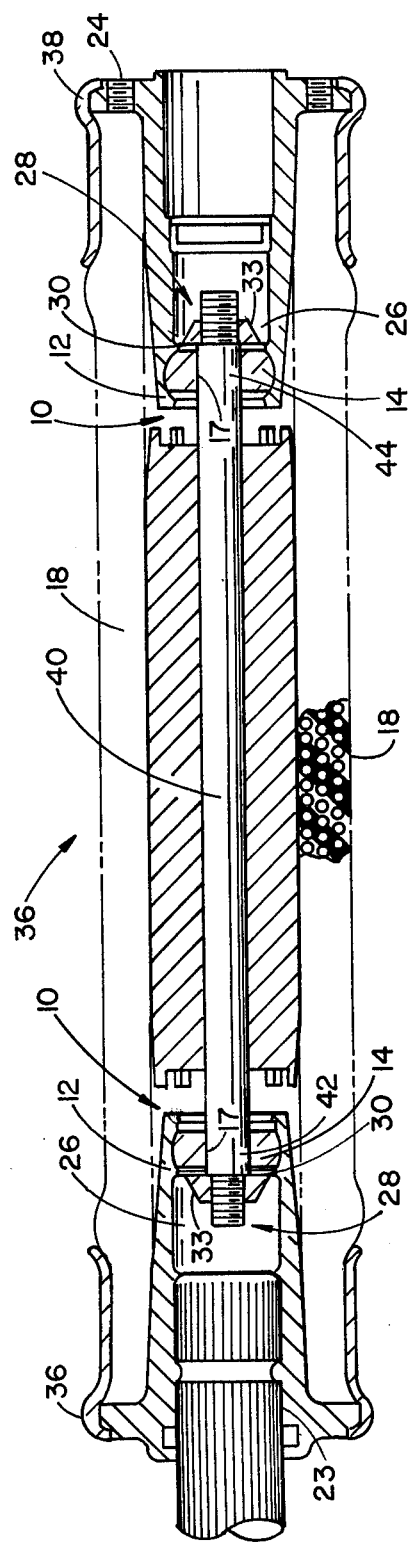
FIG. 3 is an alternate form of the invention showing an axial view of flexible shaft in combination with two centering devices.

The centering device of the invention is also useful with a flexible shaft of the type disclosed in U.S. Pat. No. 3,855,817. Referring to FIG. 3, a flexible shaft 36 with the centering device 10 of the invention is disclosed. The arrangement is very similar to that as described above. A socket member 12 is rigidly connected to each end of the flexible element with coupling members 36, 38. A spherical ball 14 is retained in each socket and a pin 40 with first and second ends 42, 44 extend from one ball to the other. Stop means 28 with a nut 33 are provided at each end 42, 44 of the pin to maintain structural integrity should the flexible element fail. As described above, the stop means is adjustable along the axial length of the pin to accommodate building tolerances so that a positive clearance is maintained. For a 3½ inch nominal outside diameter (1⅞ inches I.D.) flexible element of a shaft that is 22 inches long, an axial clearance of one-fourth to one-half inch has proved adequate. As explained above, the clearance may be selected to enhance the buckling torque of a flexible element. Of course, an axial clearance may be chosen that is greater than the longitudinal growth of a flexible element so that no enhancement of buckling strength is realized. Nevertheless, structural integrity of the shaft is still maintained.

The foregoing detailed description is made for purpose of illustration only and it is not intended to limit the scope of the invention which is to be determined from the appended claims.

What is claimed is:
1. A centering device for tubularly shaped flexible element couplings comprising:
a socket;
a ball retained in the socket, the ball having an axial aperture;
means for connecting the socket to a first end of the flexible element;
pin means with a first and extending axially through the axial aperture of the ball;
adjustable stop means with a radial extension that is greater than the diameter of the axial aperture secured to the first end of the pin means for preventing the pin means from extracting from the aperture; and
means for connecting a second end of the pin means to a second end of the flexible element.
2. The centering device of claim 1 wherein the stop means includes a collar threaded to the first end of the pin means.
3. The centering device of claim 2 comprising:
a second socket;
a second ball retained in the second socket, the second end of the pin means extending through an axial aperture of the second ball;
second means for connecting the second socket to the second end of the flexible element; and
second adjustable stop means secured to the second end of the pin means for preventing the pin means from extracting from the aperture of the second ball;
the second socket, second ball, second connecting means and second stop means constituting the second pin connecting means.
4. In a flexible coupling of the type having a tubularly shaped reinforced flexible element and first and second coupling members attached to each end of the flexible element, the improvement comprising:
a socket;
a ball retained in the socket;
means for connecting the socket to the first coupling member;
pin means with a first end extending axially through an axial aperture of the ball;
adjustable stop means with a radial extension that is greater than the diameter of the axial aperture secured to the first end of the pin means for preventing the pin means from extracting from the aperture; and
means for connecting the pin means to the second coupling member.
5. In a flexible coupling of the shaft type having a tubularly shaped flexible element with first and second coupling members attached to each end and a radial support member for the mid portion of the flexible element which leaves first and second unsupported portions of the flexible element, the improvement which comprises:
- a first socket secured to the first coupling member and internally axially disposed juxtaposed the first unsupported portion of the flexible element;
- a first ball retained in the first socket;
- a second socket secured to the second coupling member and internally axially disposed juxtaposed the second unsupported portion of the flexible element;
- a second ball retained in the second socket;
- an axially oriented pin means with first and second ends with the first end extending axially through an aperture of the first ball and the second end extending axially through an aperture of the second ball;
- first stop means secured to the first end of the pin means for preventing the pin means from extracting from the aperture of the first ball; and
- second stop means secured to the second end of the pin means for preventing the pin means from extracting from the aperture of the second ball;
- whereby axial integrity is maintained from the first to second coupling members through the first and second balls, sockets, stop means and pin.

* * * * *